(12) United States Patent
Harris (10) Patent No.: US 11,046,602 B2
(45) Date of Patent: Jun. 29, 2021

(54) FLUID PURIFICATION APPARATUS AND METHOD

(71) Applicant: Charles E. C. Harris, Chiang Rai (TH)

(72) Inventor: Charles E. C. Harris, Chiang Rai (TH)

( * ) Notice: Subject to any disclaimer, the term of this patent is extended or adjusted under 35 U.S.C. 154(b) by 87 days.

(21) Appl. No.: 16/183,434

(22) Filed: Nov. 7, 2018

(65) Prior Publication Data
US 2019/0084852 A1 Mar. 21, 2019

Related U.S. Application Data

(63) Continuation-in-part of application No. 16/112,708, filed on Aug. 25, 2018, now Pat. No. 10,906,824, and
(Continued)

(51) Int. Cl.
*C02F 1/32* (2006.01)
*C02F 1/78* (2006.01)
(Continued)

(52) U.S. Cl.
CPC ............... *C02F 1/78* (2013.01); *C02F 1/325* (2013.01); *C02F 1/001* (2013.01); *C02F 2101/101* (2013.01); *C02F 2101/203* (2013.01); *C02F 2101/206* (2013.01); *C02F 2103/42* (2013.01); *C02F 2201/3227* (2013.01); *C02F 2201/3228* (2013.01); *C02F 2303/04* (2013.01); *C02F 2303/18* (2013.01)

(58) Field of Classification Search
CPC .. C02F 1/001; C02F 1/325; C02F 1/78; C02F 2101/101; C02F 2101/203; C02F 2101/206; C02F 2103/42; C02F 2201/3227; C02F 2201/3228; C02F 2303/04; C02F 2303/18
See application file for complete search history.

(56) References Cited

U.S. PATENT DOCUMENTS

| 2,970,821 A | 2/1961 | Axt |
| 3,336,099 A | 8/1967 | Czulak |

(Continued)

FOREIGN PATENT DOCUMENTS

| DE | 3828026 | 2/1990 | |
| DE | 4110687 A1 * | 10/1991 | ............ C02F 1/325 |

(Continued)

OTHER PUBLICATIONS

Machine translation of DE 4110687 A1 (1991) (obtained from Espacenet May 2020) (Year: 1991).*

*Primary Examiner* — Lucas A Stelling
(74) *Attorney, Agent, or Firm* — Bartels Law Group (57) ABSTRACT

Disclosed is an apparatus that both makes ozone gas and enables the creation of AOPs in the fluid flowing up the lift tube. The ozone gas and UV radiation are produced by the same UV generating ozone lamps. The apparatus can easily be connected to and becomes part of a lift tube. The apparatus enables pressurized air supplied by an air pump to be partially converted into ozone as the air flows by the UV lamps. This "ozonated air" is then released into a fluid by a diffuser placed in a lift tube below the apparatus. The ozonated bubbles, in turn, create an ozonated fluid that flows up the lift tube and through the apparatus preferably through a specially designed quartz tube that is matched to the size of the lift tube.

7 Claims, 8 Drawing Sheets

Related U.S. Application Data a continuation-in-part of application No. 15/269,966, filed on Sep. 19, 2016, now Pat. No. 10,414,677.

(60) Provisional application No. 62/582,607, filed on Nov. 7, 2017, provisional application No. 62/552,853, filed on Aug. 31, 2017, provisional application No. 62/220,142, filed on Sep. 17, 2015.

(51) Int. Cl.
    *C02F 1/00* (2006.01)
    *C02F 101/10* (2006.01)
    *C02F 101/20* (2006.01)
    *C02F 103/42* (2006.01)

(56) References Cited

U.S. PATENT DOCUMENTS

| | | | |
|---|---|---|---|
| 3,550,782 A | 12/1970 | Veloz | |
| 3,692,180 A | 9/1972 | LaRaus | |
| 3,696,932 A | 10/1972 | Rosenberg | |
| 3,726,404 A | 4/1973 | Troglione | |
| 4,069,153 A | 1/1978 | Gunther | |
| 4,141,830 A | 2/1979 | Last | |
| 4,176,061 A | 11/1979 | Stopka | |
| 4,179,616 A | 12/1979 | Coviello et al. | |
| 4,230,571 A | 10/1980 | Dadd | |
| 4,273,660 A | 6/1981 | Beitzel | |
| 4,274,970 A | 6/1981 | Beitzel | |
| 4,323,810 A | 4/1982 | Horstmann | |
| 4,422,450 A | 12/1983 | Rusteberg | |
| 4,437,999 A | 3/1984 | Mayne | |
| 4,694,179 A | 9/1987 | Lew et al. | |
| 4,752,401 A | 6/1988 | Bodenstein | |
| 4,857,204 A | 8/1989 | Joklik | |
| 4,892,712 A | 1/1990 | Robertson et al. | |
| 4,913,827 A | 4/1990 | Nebel | |
| 4,968,437 A | 11/1990 | Noll et al. | |
| 5,037,550 A | 8/1991 | Montagnon et al. | |
| 5,043,079 A | 8/1991 | Hallett | |
| 5,071,550 A | 12/1991 | Bernhardt | |
| 5,082,558 A | 1/1992 | Burris | |
| 5,106,495 A | 4/1992 | Hughes | |
| 5,106,501 A | 4/1992 | Yang et al. | |
| 5,120,450 A | 6/1992 | Stanley, Jr. | |
| 5,141,636 A | 8/1992 | Flanagan et al. | |
| 5,158,454 A | 10/1992 | Viebahn et al. | |
| 5,169,606 A | 12/1992 | Batchelor | |
| 5,178,755 A | 1/1993 | LaCrosse | |
| 5,178,758 A | 1/1993 | Hwang | |
| 5,180,499 A | 1/1993 | Hinson et al. | |
| 5,190,648 A | 3/1993 | Ramsauer | |
| 5,207,993 A | 5/1993 | Burris | |
| 5,213,773 A | 5/1993 | Burris | |
| 5,230,792 A | 7/1993 | Sauska | |
| 5,266,215 A | 11/1993 | Engelhard | |
| 5,268,104 A | 12/1993 | Masoomain | |
| 5,302,298 A | 4/1994 | Leitzke | |
| 5,352,369 A | 10/1994 | Heinig, Jr. | |
| 5,395,522 A | 3/1995 | Melanson et al. | |
| 5,431,861 A | 7/1995 | Nagahiro et al. | |
| 5,494,576 A | 2/1996 | Hoppe et al. | |
| 5,520,893 A | 5/1996 | Kasting, Jr. et al. | |
| 5,534,156 A | 7/1996 | Sanderson | |
| 5,540,848 A | 7/1996 | Engelhard | |
| 5,547,590 A | 8/1996 | Szabo | |
| 5,622,622 A * | 4/1997 | Johnson | C02F 1/325 210/192 |
| 5,641,399 A | 6/1997 | Rawlins | |
| 5,695,635 A | 12/1997 | Sasaki et al. | |
| 5,707,594 A | 1/1998 | Austin | |
| 5,709,799 A | 1/1998 | Engelhard | |
| 5,711,887 A | 1/1998 | Gastman et al. | |
| 5,925,320 A | 7/1999 | Jones | |
| 5,935,431 A | 8/1999 | Korin | |
| 5,942,125 A | 8/1999 | Engelhard et al. | |
| 6,159,606 A | 12/2000 | Gelderie et al. | |
| 6,267,895 B1 | 7/2001 | Engelhard et al. | |
| 6,461,520 B1 | 10/2002 | Engelhard et al. | |
| 6,468,433 B1 | 10/2002 | Tribelski | |
| 6,491,879 B2 | 12/2002 | Conrad | |
| 6,511,594 B2 | 1/2003 | Shaw | |
| 6,511,638 B2 | 1/2003 | Stone | |
| 6,892,039 B2 | 5/2005 | Okamoto et al. | |
| 6,932,903 B2 | 8/2005 | Chang | |
| 6,939,397 B2 | 9/2005 | Nelsen et al. | |
| 8,470,170 B2 | 6/2013 | Harris | |
| 8,753,523 B2 | 6/2014 | Harris | |
| 9,316,011 B2 | 4/2016 | Harris | |
| 2004/0226893 A1 | 11/2004 | Kamimura et al. | |
| 2005/0163648 A1 | 7/2005 | Liang | |
| 2007/0248488 A1 | 10/2007 | Denkewicz | |
| 2010/0085691 A1 | 4/2010 | Yeh et al. | |
| 2014/0209521 A1 | 7/2014 | Harris | |
| 2016/0122208 A1 | 5/2016 | Denkewicz | |
| 2019/0135658 A1 * | 5/2019 | Yamakoshi | C02F 1/325 |

FOREIGN PATENT DOCUMENTS

| | | |
|---|---|---|
| EP | 0227266 | 7/1987 |
| EP | 0235315 | 9/1987 |
| EP | 0237793 | 9/1987 |
| EP | 0316687 | 5/1989 |
| JP | H03143586 | 6/1991 |
| JP | H04141296 | 5/1992 |
| WO | WO1999065533 | 12/1999 |
| WO | WO2000071227 | 11/2000 |
| WO | WO2004033376 | 4/2004 |

* cited by examiner

FLUID PURIFICATION APPARATUS AND METHOD

PRIORITY

The present application claims priority to U.S. Provisional Patent Application Ser. No. 62/582,607 filed on Nov. 7, 2017, the entirety of which is incorporated herein by reference. The present application is a continuation-in-part of, and claims priority to co-pending U.S. patent application Ser. No. 16/112,708, filed Aug. 25, 2018, the entirety of which is incorporated herein by reference. The present application also claims priority to U.S. Provisional Patent Application Ser. No. 62/552,853 filed on Aug. 31, 2017, the entirety of which is incorporated herein by reference. The present application is also a continuation in part of, and claims priority to co-pending U.S. patent application Ser. No. 15/269,966, filed Sep. 19, 2016, the entirety of which is incorporated herein by reference. The present application also claims priority to U.S. Provisional Application Ser. No. 62/220,142, filed Sep. 17, 2015, the entirety of which is incorporated herein by reference.

FIELD OF INVENTION

This invention relates in general to a purification apparatus, and more specifically to an apparatus which both creates ozone gas and simultaneously creates and radiates UV germicidal light into fluid in a transparent tube, preferably made of quartz. The fluid is preferably water with dissolved ozone and ozonated air bubbles, for the dual purpose of disinfecting such fluid and creating advanced oxidation products (AOPs).

BACKGROUND

In recent years, researchers have discovered that exposing ozonated fluid, such as water, with UV germicidal radiation creates advanced oxidation products which have far greater disinfection potential than using either ozone or UV germicidal radiation alone. As a result, a number of such units (hereinafter "Ozone/UV Units") have appeared in publications and in the marketplace. Prior Ozone/UV Units are designed to function with a pressure fluid pump wherein ozonated fluid is under pressure and undissolved bubbles containing air, oxygen, and/or ozone pass right through the unit without coalescing, inhibiting, or stopping the flow of fluid. Such Ozone/UV Units are normally oriented horizontally with plumbing connections at 90 degree angles to the flow of fluid. Many such prior art units dissolve ozone into the fluid by means of a venturi.

SUMMARY OF THE INVENTION

In contrast to the prior art, the apparatus of the present invention is preferably oriented vertically, or substantially so, to function with a lift tube and, in one embodiment, with a fluid treatment system as described in U.S. Pat. No. 8,470,170 (hereinafter simply referred to as the "Sifer" system). Of course, the apparatus herein can be used horizontally as a traditional Ozone/UV Unit where the whole system is functioning with a high-pressure fluid pump, in which case the ozone may or may not be connected to a venturi depending upon the design of such a system.

The present invention improves on prior art Ozone/UV Units by a design which can be used with a lift tube wherein fluid flows not by the action of a water pump, but by the action of rising bubbles of ozonated air, as more specifically described in U.S. Pat. No. 8,470,170. The apparatus disclosed by the present invention herein is a "lift tube-friendly" apparatus in that it can easily be connected to and becomes part of a lift tube. The apparatus both makes ozone gas and enables the creation of AOPs in the fluid flowing up the lift tube. The ozone gas and UV radiation are produced by the same UV generating ozone lamps. The apparatus preferably uses pressurized air supplied by an air pump, and the oxygen in such pressurized air is partially converted into ozone as the air flows by one or more UV lamps. This "ozonated air" is then preferably released into the fluid by a diffuser placed in the lift tube below the apparatus. The ozonated bubbles in turn create an ozonated fluid that flows up the lift tube and through the apparatus through a specially designed quartz tube whose diameter preferably matches the diameter of the lift tube.

The apparatus of the present invention can therefore take advantage of the benefits of fluid treatment disclosed in the U.S. Pat. No. 8,470,170 by allowing for the generation of ozone, UV germicidal disinfection, and the creation of AOPs in combination with a lift tube. The motive flow of the entire system is preferably caused by rising bubbles of gas (primarily ozonated air or oxygen), as opposed to a higher pressure fluid pump. As used in this manner, the apparatus is an entirely new and efficient approach for how ozone, UV germicidal technology, and the creation of AOPs are used in combination.

Some of the benefits of the apparatus of the present invention include, but are not limited to: 1) the ability to function as part of a lift tube with the fluid flowing through the unit under the "power" of rising bubbles of ozonated air or oxygen, and without the need for a higher pressure fluid pump (Used in this fashion, the present invention allows for greater "contact" time for disinfection due to the slower current of the fluid and/or a much greater volume of fluid to be treated through the use of the lift tube and aeration method); 2) the ability to accommodate a very high volume of air and ozone going through the unit to a diffuser located lower down in the lift tube or just under the apparatus itself and to capitalize on that high volume of pressurized gas to generate a very large flow of rising fluid to be treated; 3) a design which saturates and bombards the flowing fluid in the lift tube with UV germicidal radiation from all angles as the fluid flows through the center of the apparatus by virtue of a design in which the ozone and UV germicidal generating lamps are arrayed such that they surround the fluid flowing up and inside a transparent tube, preferably a specially made quartz tube which allows both the UV germicidal 254 nanometer wavelength radiation (normally wasted in a typical ozone generator) and ozone-creating 185 nanometer wavelength radiation to bombard the fluid; 4) Preferably, the use of a mirror-type surface on the inside surface of the outer sealed first chamber (the space where the UV lamps are located) to reflect the UV light back towards the quartz tube; 5) the ability to scale the number of lamps, the size and lengths of the lamps (and the apparatus itself), and the selection of different materials to vary the output of the lamps and the transmission qualities of the quartz tube; 6) providing a cooling jacket of fluid (typically water) for the sealed first chamber, thereby allowing the apparatus to generate ozone more efficiently in a cooler environment; 7) the ability to adjust the volume of fluid, typically water, going through the lift tube and the apparatus depending upon the application, such as the size of a pool, spa, fluid storage tank, or other main reservoir to be treated, by selecting a suitable lift tube and matching quartz tube; 8) the ability to use CD or other UV ozone generators in an alternate embodiment using a venturi if the ozonated fluid and bubbles are released into the lift tube inside or below the apparatus; and 9) the ability to remove any particles of damaged quartz or ozone lamps which might break apart and end up in the fluid flow by installing a filter downstream from the apparatus.

Broadly stated, the present invention is a combination ozone generator and UV germicidal apparatus. The apparatus is designed to function with a source of filtered pressurized air from an appropriately sized air pump or air pumps. In one embodiment, the apparatus includes a first sealed chamber having a first opening for enabling air to enter said first chamber and a second opening for enabling air or oxygen and ozone gas to exit said first chamber, a UV light source positioned inside said first sealed chamber in a manner so as to cause air coming in from said first opening to be radiated by said UV light source as the air flows towards the second opening in said first sealed chamber, to cause at least some of the air to be converted into ozone gas, a conduit for enabling said air and ozone gas to be coupled to a diffuser placed below the apparatus or suspended at the bottom of a lift tube connected to the apparatus, a second sealed container positioned inside said first sealed container including a quartz tube able to transmit 185 and 254 nanometer wavelength light, wherein the interior of said quartz tube defines a second space isolated from said first space; and third and fourth openings in said first sealed container operatively connected to respective ends of said quartz tube for enabling ozonated fluid flowing in said lift tube to flow into the interior of said quartz tube via said third opening and to exit said quartz tube through said fourth opening; said one or more UV light sources for causing said ozonated fluid flowing in the interior of said quartz tube to be irradiated by UV light, said irradiation enabling a germicidal effect to be created in said fluid.

In an alternate embodiment, a sealed third chamber surrounds the first sealed chamber. This third sealed chamber is sized to be filled with fluid, typically water, to enable the cooling of the first sealed chamber.

BRIEF DESCRIPTION OF THE DRAWINGS

The accompanying drawings, which are incorporated in and constitute a part of this specification, exemplify embodiments of the present invention and, together with the description, serve to explain and illustrate principles of the invention and not to limit the claimed invention thereto. The drawings are intended to illustrate major features of the exemplary embodiments in a diagrammatic manner. The drawings are not intended to depict every feature of actual embodiments nor relative dimensions of the depicted elements, and are not drawn to scale. Note also that reference symbols or names are used in the Figures to indicate certain aspects or features shown therein, with reference symbols common to more than one Figure indicating like components, aspects or features shown therein.

The features, advantages, and benefits of the present invention will become more apparent from the following description taken in conjunction with the accompanying drawings, which are presented solely for exemplary purposes and not with the intent to limit the invention thereto, and in which.

DETAILED DESCRIPTION OF THE INVENTION

The present invention is a fluid purification apparatus which combines the creation of ozone and the simultaneous radiation of fluid for disinfection and creation of advanced oxidation products by the use of UV ozone lamps. Ozone is typically used to destroy pathogens in fluid such as water. Similarly, UV germicidal radiation is used to inactivate many pathogens as well. Combining these two technologies together has proven to be synergistic by virtue of the creation of advanced oxidation products (AOPs) whereby UVC radiating ozonated fluid, typically water, coverts the dissolved ozone, through a series of reactions, to oxygen and hydroxyl molecules and other advanced oxidation products which are very lethal to many different types of pathogens; i.e., the power to kill and neutralize pathogens is much greater than when ozone or UV germicidal radiation is used alone.

In one embodiment of the present invention, ozone is produced by pumping filtered ambient air past one or more ozone producing UV lamps housed in a first sealed chamber. The treated air is pumped past, over, and through the space around one or more ozone lamps formed by the interior surface of the sealed container and the outer surface of a quartz tube at the rate and pressure appropriate for the application involved. Ozone makes up less than 1% of the total output (most UV ozone generators produce ozone on the order of 0.1 to 0.01% by weight of air fed to the generator)—the other 99% of the gas stream is air that has preferably been pre-treated, i.e., air that has been filtered and treated in order to be relatively free of pathogens, germs, algae spores, dust, and other impurities. Preferably, this mixture of air and ozone gas, i.e., ozonated air, is piped to a diffuser positioned inside a lift tube filled with fluid, typically water. The diffuser releases thousands of tiny bubbles which cause the fluid to rise and cause a flow of fluid up the lift tube and through the combination ozone generator and UV germicidal unit and from there out to and through a preferably further section of a lift tube for filtration and/or return to a main reservoir. The bubbles expand as they rise in the lift tube and create an upward flow in the fluid contained in the lift tube. As used with the alternative ozone-assisted fluid treatment system according to one embodiment of the present invention, the treated fluid flows into an auxiliary reservoir and a filter and returns to a main reservoir, which typically may be a swimming pool, spa, or water storage tank. The larger the main reservoir, the more air, ozone, UV germicidal disinfection, and AOPs are required, and of course, the larger the apparatus must be with more and/or longer UV ozone lamps, sealed chambers, and quartz tube.

A related provisional patent application, Ser. No. 62/552,853, titled "Ozone-Assisted Fluid Treatment Apparatus and Method," filed Aug. 31, 2017 discloses a unique method of treating pools, spas, and water storage tanks using ozone, UV germicidal radiation from ozone lamps and from dedicated UV germicidal lamps, and the making of advanced oxidation products (APOs). This patent application is incorporated herein in its entirety by reference.

Another related patent application, Ser. No. 12/634,652, titled, "Ozone Generator Apparatus and Method for Purification of Air or Liquids," filed Dec. 9, 2009, discloses a unique ozone generator which provides significant improvements to existing pool, spa, and fluid storage tank ozone fluid treatment systems. Even though it has been abandoned, that patent application is incorporated herein in its entirety by reference.

Figure 1:
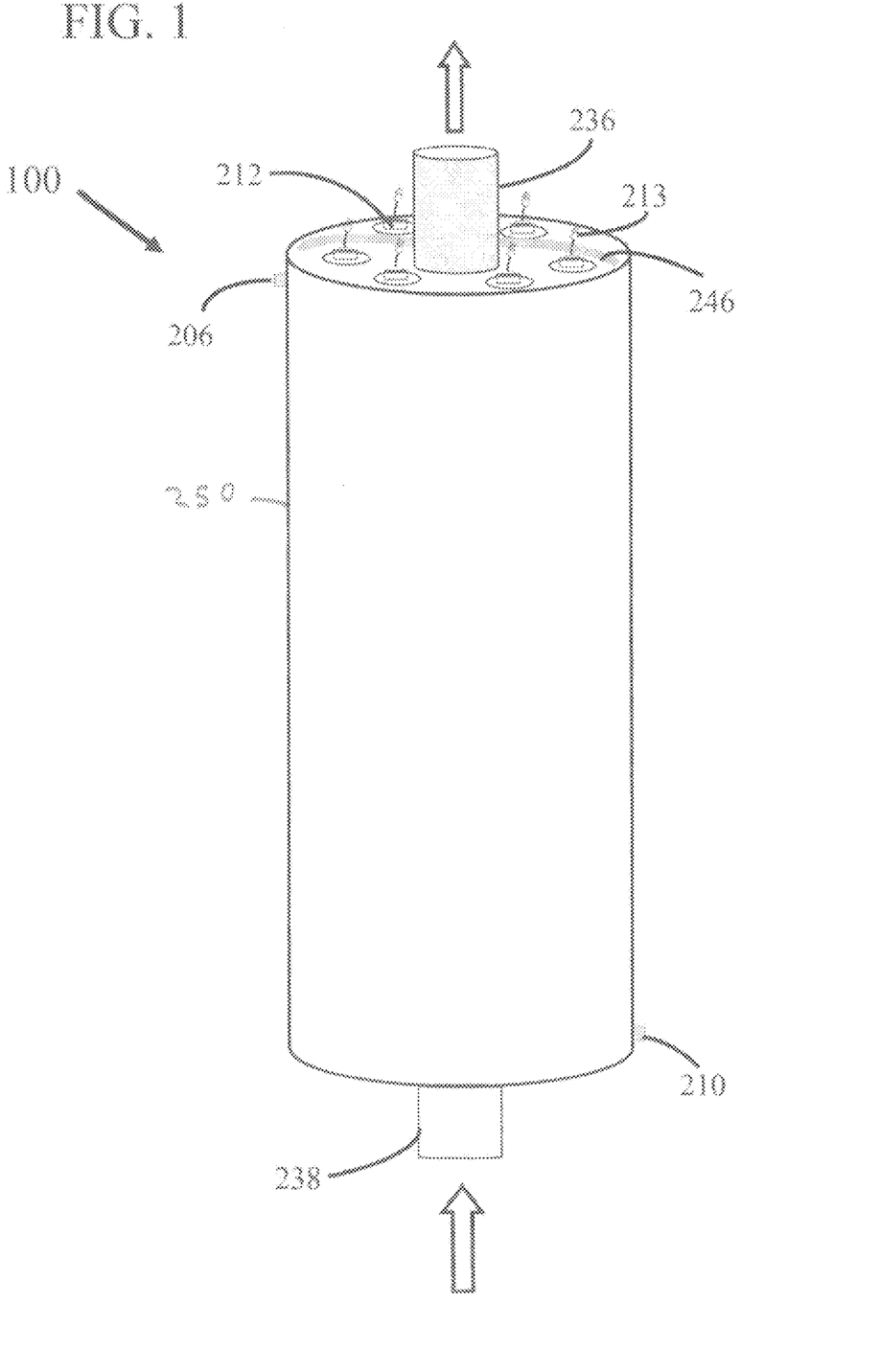
FIG. 1 illustrates a perspective view of a combination ozone generator and UV germicidal apparatus according to one embodiment of the present invention.
Figure 2:
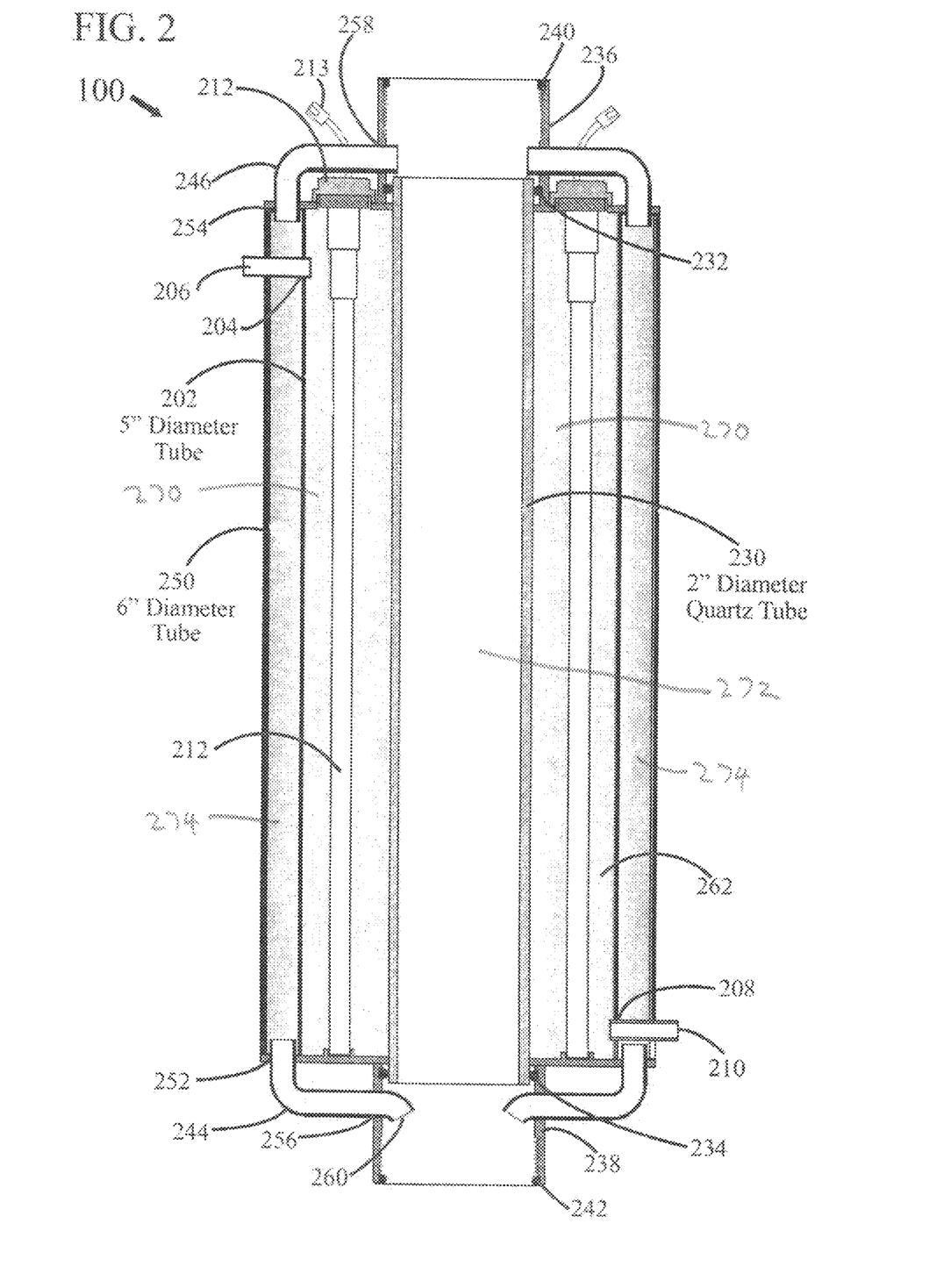
FIG. 2 illustrates a sectional view of a combination ozone generator and UV germicidal apparatus according to one embodiment of the present invention.

Referring now to FIGS. 1 and 2, shown in this figure is a perspective view of a combination ozone generator and UV germicidal radiation apparatus 100 according to one embodiment of the present invention. FIG. 1 shows a sealed container containing preferably six (6) UV lamps 212, and six (6) UV lamp connectors 213. The UV lamps are powered by electric cables connected to connectors 213 (not shown). This view also shows a connector 206 for enabling air to be pumped into a first space inside the first sealed container 202 (via an opening 204 as shown in FIG. 2), top end-cap 236, and a second connector 210 for enabling the exit of pressurized ozonated air from the first sealed container 202 (via an opening 208 as shown in FIG. 2). As also seen, a cooling fluid conduit 246 from the third sealed chamber 250 (as shown in FIG. 2), and the bottom end-cap 238.

Figure 5:
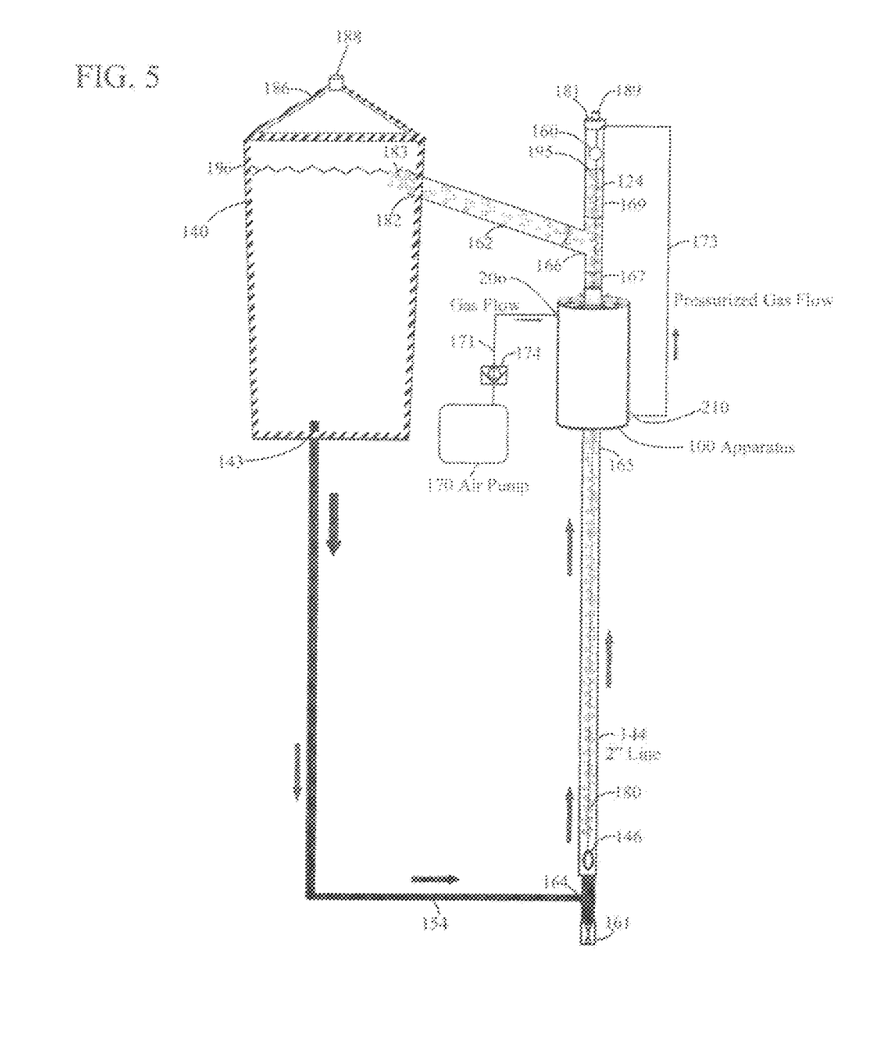
FIG. 5 illustrates a combination ozone generator and UV germicidal apparatus shown in FIGS. 1 and 2, according to one embodiment of the present invention, connected to and made part of a lift tube for use with a fluid storage tank or similar main reservoir.

The arrows in FIG. 1 depict the preferred direction of fluid flow. The fluid preferably flows up through apparatus 100 by entering the bottom end-cap 238 from a connecting lift tube 144 and connector 165 (as shown in FIG. 5) and exits through the top end-cap 236 which is preferably connected to another lift tube section 169 via fitting 167 and three-way connector 166 (both of which are shown in FIG. 5).

Figure 1A:
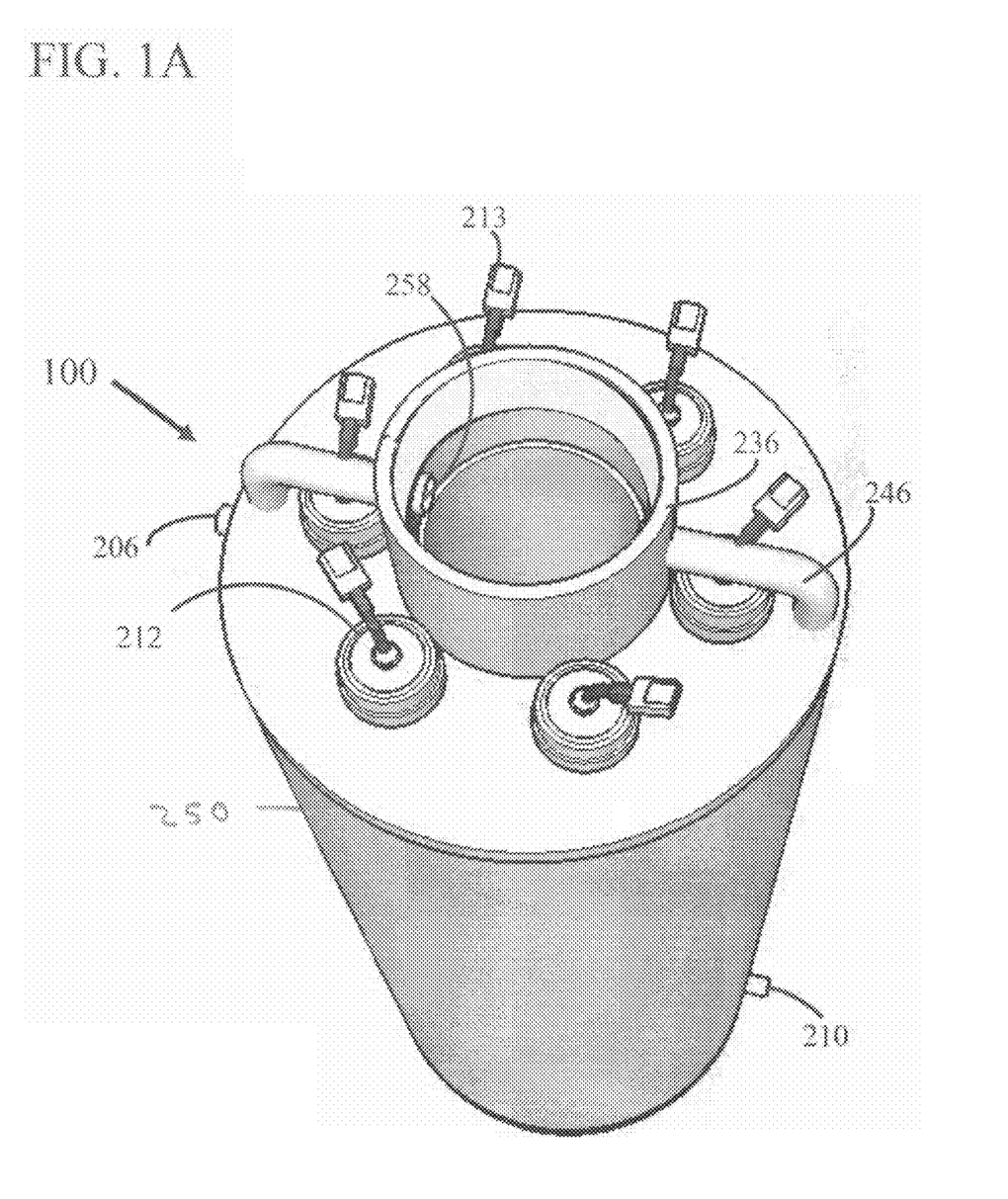
FIG. 1A illustrates another perspective view of the combination ozone generator and UV germicidal apparatus shown in FIG. 1.

FIG. 1A illustrates a second perspective view of a combination ozone generator and UV germicidal radiation apparatus 100 according to one embodiment of the present invention. This view shows the 6 UV lamps 212, 6 UV lamp connectors 213, connector 206 to the first sealed container 202 (as shown in FIG. 2), top end-cap 236, connector 210 for the exit of pressurized ozonated air from a first sealed chamber or space 270 formed by tube 202 (as shown in FIG. 2).

Figure 6:
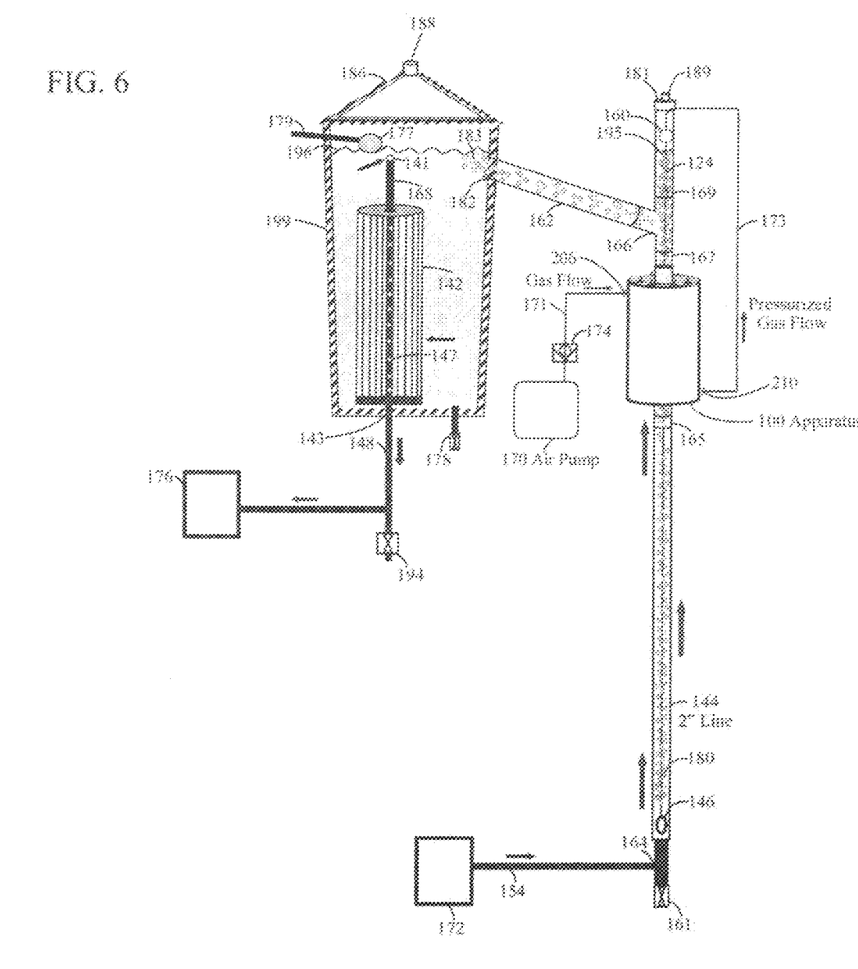
FIG. 6 illustrates a combination ozone generator and UV germicidal apparatus shown in FIGS. 1 and 2, according to another embodiment of the present invention, connected to and made part of a lift tube and an auxiliary reservoir for use with a pool, spa, fluid storage tank, or similar main reservoir.

FIG. 2 illustrates a sectional view of apparatus 100 according to one embodiment of the present invention, with one half cut away to show the interior of apparatus 100. As seen in FIG. 2, the components of apparatus 100 include a sealed preferably annular first chamber 270, mentioned above, which has an opening 204 fitted with a connector 206 for allowing pressurized, treated, and filtered air from an air pump 170 (as shown in FIGS. 5 and 6) to enter the first sealed chamber 270. In an alternate embodiment, the opening may be connected to an internal manifold with multiple ports to allow for an even distribution of air entering the first sealed chamber 270. Pressurized ozonated air flows past the UV lamps 212 and then exits the first sealed chamber 270 through the second opening 208 and connector 210.

After the pressurized air enters the first chamber 270, it passes over and around one or more UV ozone lamps 212 (in the embodiment shown, there are six such lamps) which emit both 185 and 254 nanometer wavelength light. As mentioned above, a small percent of the air is converted into ozone gas.

After exiting the apparatus 100 through connector 210, in one embodiment the mixture of pressurized air and ozone can be piped through conduit 173 to the top of a lift tube 169 above fluid level 195 (as shown in FIGS. 5 and 6), preferably through a check valve anti-siphon device 160, and then down through a conduit 124 positioned in the lift tube whose end is connected to a diffuser 146 (as shown in FIGS. 5 and 6) placed down below the apparatus 100 preferably at or near the bottom of the lift tube 144, or in the alternative, the diffuser 146 may be positioned directly under (not shown) the apparatus. The anti-siphon device 160 is used to prevent fluid, typically water, from flowing backwards into opening 208 in the apparatus 100 in the event of a leak or loss of pressurized air inside the apparatus 100 (for example, if a line breaks or the air pump is turned off). In the alternative, a check-valve (not shown) may be connected to the out-flow opening 208 of the apparatus 100 to prevent water from flooding the apparatus 100.

Positioned through the center of the apparatus 100 and running preferably parallel to it is a second sealed container comprising, at least in part, a transparent tube 230. Tube 230 is preferably removable from apparatus 100 for cleaning, maintenance, repair, or replacement. Transparent tube 230 is preferably made of quartz specially designed to allow the 185 and 254 nanometer wavelengths of light from the UV ozone lamps to pass through to the ozonated fluid flowing up through the quartz tube. The 254 nanometer wavelength converts some of the ozone in the ozonated fluid into oxygen and advanced oxidation products (AOPs), depending upon the intensity and type of UV ozone lamps used. It is also possible that the 185 nanometer wavelength light may convert some of the air inside the air bubbles into ozone gas which in turn may be further converted into oxygen and AOPs.

Depending upon the application, the fabrication and material selected in the making of the quartz tube (i.e., doping the quartz with various ingredients) may vary its ability to transmit 185 or 254 wavelength light, either to maximize or minimize the aforementioned wavelengths, which would in turn vary the amount of ozone in the fluid flow or maximize the germicidal effect and production of AOPs in the fluid. In one alternative, apparatus 100 may be fitted with a "sight tube" (not shown) to see inside the first, second, and third sealed chambers, formed by tubes 202, 230 and 250, to enable observation of the rising bubbles in order to determine if the quartz tube needs to be cleaned or removed for maintenance. In one alternative, the apparatus may be fitted with a "Y" connector (not shown) on the top of the apparatus 100 (for example, a "Y" connector attached to fitting 167) to allow for easy access with a brush for cleaning the inner surface of the quartz tube.

As seen in FIG. 2, the interior of the quartz tube, shown as a second space 272, is isolated from the annular space, shown as the first space 270. First space 270 is defined by the inner surface of tube 202 and the outer surface of quartz tube 230. The space 272 is preferably sealed with an O-ring 232 at the top and another O-ring 234 at the bottom of apparatus 100 in order to isolate the fluid contained in the quartz tube from the pressurized gas in the said first annular space 270. In one embodiment, the O-rings also serve to seal the pressurized gas from leaking out of the first sealed chamber. O-ring 232 is placed inside an end-cap 236 sealed to the apparatus 100, and O-ring 234 is placed inside an end-cap 238 sealed to the apparatus. Both end-caps 236 and 238 are preferably welded and made a part of apparatus 100. However, top and bottom end-caps 236 and 238 may be sealed by the use of nuts, bolts, and seals (not shown), sanitary unions (not shown), clamps (not shown), or any combination, or by other alternatives designed by those skilled in the art. In addition, each end-cap 236 and 238 may be made to accommodate O-rings 240 and 242, at the top and bottom of apparatus 100, respectively, in order to connect fittings 165 and 167 which in turn connect to the lift tubes 144 and 169, respectively, above and below apparatus 100 as shown in FIGS. 5 and 6. In the embodiments shown in FIGS. 5 and 6, fitting 167 connects directly from top end-cap 236 of apparatus 100 to three-way connector 166, which in turn connects to lift tube 169 and conduit 162.

Also shown in FIG. 2 is a third preferably annular sealed chamber 274 formed by tube 250 that surrounds tube 202 and first space or chamber 270. Conduits 244 and 246 are provided fix enabling fluid, preferably water, to enter and exit sealed chamber 274 through respective openings 252 and 254 at the bottom and top, respectively, of the third sealed chamber 274. FIG. 2 shows two such fluid conduits; however, there may be more such conduits and larger conduits to allow the fluid in the third sealed chamber 274 to enter and exit at openings 256 and 258 of the bottom and top, respectively, of the apparatus 100.

As seen in FIG. 2, the fluid preferably enters chamber 274 via conduit 244 from below and exits via conduit 246 out of the third sealed chamber 274 from above by simple action of heat, or by using some of the force of rising fluid in the lift tube 144 below apparatus 100 to help "push" fluid into the conduit 244 and up through the third sealed chamber 274. Other methods of causing cooling fluid to flow into and out of chamber 274 are also well known in the art. Conduit 244 extends out into the rising fluid at 260 in order help direct the fluid into the third sealed chamber 274. As shown in FIG. 2, the conduits 244 and 246, the openings 252 and 254, and openings 256 and 258 (all of which are shown on the left side of FIG. 2), all have corresponding conduits and openings on, the right side of FIG. 2.

In the alternative, removable hoses (not shown) or even larger pipes (not shown) may be connected to the lift tube 144 below apparatus 100 and then connected to the third sealed chamber 274, and a second set of hoses (not shown) or pipes (not shown) connected to the third sealed chamber 274 at the top of apparatus 100 to fitting 167 or connector 166 so that the fluid would flow upwards and through the third sealed chamber 274 in a greater amount than as shown in FIG. 2. If hoses or pipes are used, any angle or deviation from the vertical axis (preferably the lift tubes 144 and 169 are straight up) must be very gradual so as to minimize the potential of the bubbles to coalesce. While various O-rings and gaskets may be used, to seal the hoses or pipes mentioned above connecting fluid in the third sealed chamber 274, other alternative ways to connect and seal the fluid are known to those skilled in the art.

As stated above, the third sealed chamber 274, according to one embodiment of this invention, contains fluid for the purpose of cooling the apparatus 100 and specifically the first sealed chamber 270. Other alternative ways to cool the first sealed chamber 270 are known to those skilled in the art. The third sealed chamber 274 may also be expanded in diameter so that it can be used as a by-pass for some of the ozonated fluid in lift tube 144, using conduits 244 and 246 or the hoses (not shown) and/or pipes (not shown) mentioned above if, depending upon the application, there is a need to vary the amount of ozone converted into oxygen to create AOPs, and/or to vary the amount of residual ozone in the fluid after it has flowed past the apparatus 100. Fluid rising through the third sealed chamber 274 is not exposed to any UV germicidal radiation and therefore, there is no conversion of ozone into oxygen or the creation of AOPs. Any such by-pass design could include a valve (not shown) to enable the amount of fluid flowing through the third sealed chamber 274 to be adjusted. Whatever method is used to allow fluid to enter and exit the third sealed chamber 274, care must be exercised to prevent any bubbles from blocking the fluid from exiting the third sealed chamber 274 or from flowing up the connections, fittings, conduits, and lift tube below and above apparatus 100.

The size of apparatus 100 is scalable to the application and water treatment needs desired. For example, in FIG. 2, according to one embodiment of the invention, with a 2" diameter lift tube 144 as shown in FIGS. 5 and 6, it would be sized with a quartz tube 2" in diameter. A 3" lift tube would be sized with a 3" quartz tube. Also, the number, size, and specifications of the UV ozone lamps can vary. In FIG. 2, there are six UV ozone lamps 212 which might be 35 cm or 75 cm long (producing about 18 or 36 grams of ozone per day, respectively) in the first sealed chamber 202.

In the embodiment shown, the quartz tube is 2 inches in diameter, the first sealed chamber 202 preferably has an outer diameter of 5" formed by a circular tube, preferably made of stainless steel or other strong ozone-resistant material that surrounds the quartz tube 230. The inner surface 262 of the stainless steel tube comprises the outer surface of first sealed chamber 202. Surface 262 is preferably polished to a mirror finish, or otherwise caused to have a significant reflectivity, to reflect UV radiation produced by the UV ozone lamps towards the quartz tube 230. as needed, this mirror finish 262 can be repeatedly polished by removing the quartz tube 230 and UV ozone lamps 212 and brushing the inner surface 262 of the 5" tube.

The UV ozone lamps 212 are also preferably sealed (not shown) at the point where they are fitted into the top of the apparatus 100. As disclosed above, the first sealed chamber 202 is surrounded by a third sealed chamber 274 filled with fluid, typically water. In this exemplary embodiment, this third sealed chamber 274 is preferably formed by a 6" diameter tube 250 that surrounds the 5" tube 202 to create an annular space in between the 5" and 6" tubes. In other words, the 5" tube forms the wall between annular chambers 270 and 274. As indicated above, annular chamber 274 can be filled with fluid to enable cooling of the first sealed chamber 270.

The number of lamps, the cross-sectional shape, the lengths of the first and second sealed chambers, and the diameter of the quartz tube can vary and those skilled in the arts can select approximate dimensions as exemplified in apparatus 100. In selecting various sizes, factors to be considered include the needs of the application, the size of the lift tube and matching quartz tube, the manner in which pressurized treated air enters and mixes in the first sealed chamber so that maximum ozone gas is produced, and the manner in which the air and ozone exit the apparatus 100, etc. Care must be taken to make sure that all the air and other gases are circulating properly in the first space 270 inside the first sealed container 202 for maximum ozone production. With care, larger sizes of the apparatus 100 can be made. For example, the apparatus 100 could be fabricated to use a 3" or 4" quartz tube to match a corresponding 3" or 4" lift tube, and the first and second sealed chambers would be sized correspondingly larger. Other alternative designs may be for the use of only two UV ozone lamps, although four or eight ozone lamps (or more) could just as well be used if the first and second sealed chambers are appropriately sized. In addition, the lengths of the UV ozone lamps may be as short as 35 cm (or shorter) or as long as 120 cm (or longer). Of course, the first and second sealed chambers, the quartz tube, etc., must be adjusted to accommodate such variations, and those skilled in the art should be able to fabricate units with varying capacities of ozone and UV disinfection, as described above.

Finally, the apparatus 100 can be fitted with a weather-proof cap (not shown) under which the electrical connections 213 for the UV ozone lamps are connected to a common electrical bus (not shown) and exit the cap to connect to an electrical controller (not shown) typically placed in a pump room or the like which would contain various electrical safety devices, ballasts, operation sensors, UV light source on/off indicators, and other electrical components required for the proper, safe, and efficient functioning of the UV ozone lamps and the apparatus 100. The weather-proof cap also may have ports for the pressurized gas lines going to and from the apparatus 100. Preferably, the diffuser 146 (as shown in FIGS. 5 and 6) and the line 124 connected to the anti-siphon valve 160 and pressurized ozonated gas 173 (as shown in FIGS. 5 and 6) would be lowered down the inside of the lift tubes 169 and 144 and quartz tube 230 for easy placement and removal of the diffuser 146. The weather-proof cap would also keep the UV ozone lamp connections 213 from getting damaged and keep the top of the apparatus 100 clean for maintenance or repair. Typically, the UV ozone lamps 212 must be replaced every 18 to 24 months.

By combining ozonated fluid and a germicidal UV lamp in a single apparatus 100, the UV light interacts with the ozone, and the resulting chemical reactions generate hydroxyl free radicals (AOPs) in the fluid flowing in the lift tube. Normally AOPs form and disappear very quickly (normally they last less than a second). However, even though lasting only a fraction of a second, the hydroxyl free radicals have even more oxidation potential than ozone. As a result, the purification power of treatment apparatus 100 is increased. Also, as an oxidizer, AOPs reduce the oxidative load that ozone would be expected to handle. So, even though ozone might be sacrificed to make AOPs, the ozone that is left will have a higher concentration than otherwise due to a lower demand for oxidation. Since UV radiation of ozonated water converts ozone to simple oxygen as it creates advanced oxidation products (AOPs), care must be taken with the operation of the ozone lamps 212 which generates UV germicidal radiation by selecting its intensity, time of operation per day, whether or not another UV germicidal lamp is also operating in another conduit, and the application so that an ozone residual can be maintained in a pool, spa, or water storage tank if ozone is to be used as a primary disinfectant in lieu of chlorine or other chemicals.

Figure 3:
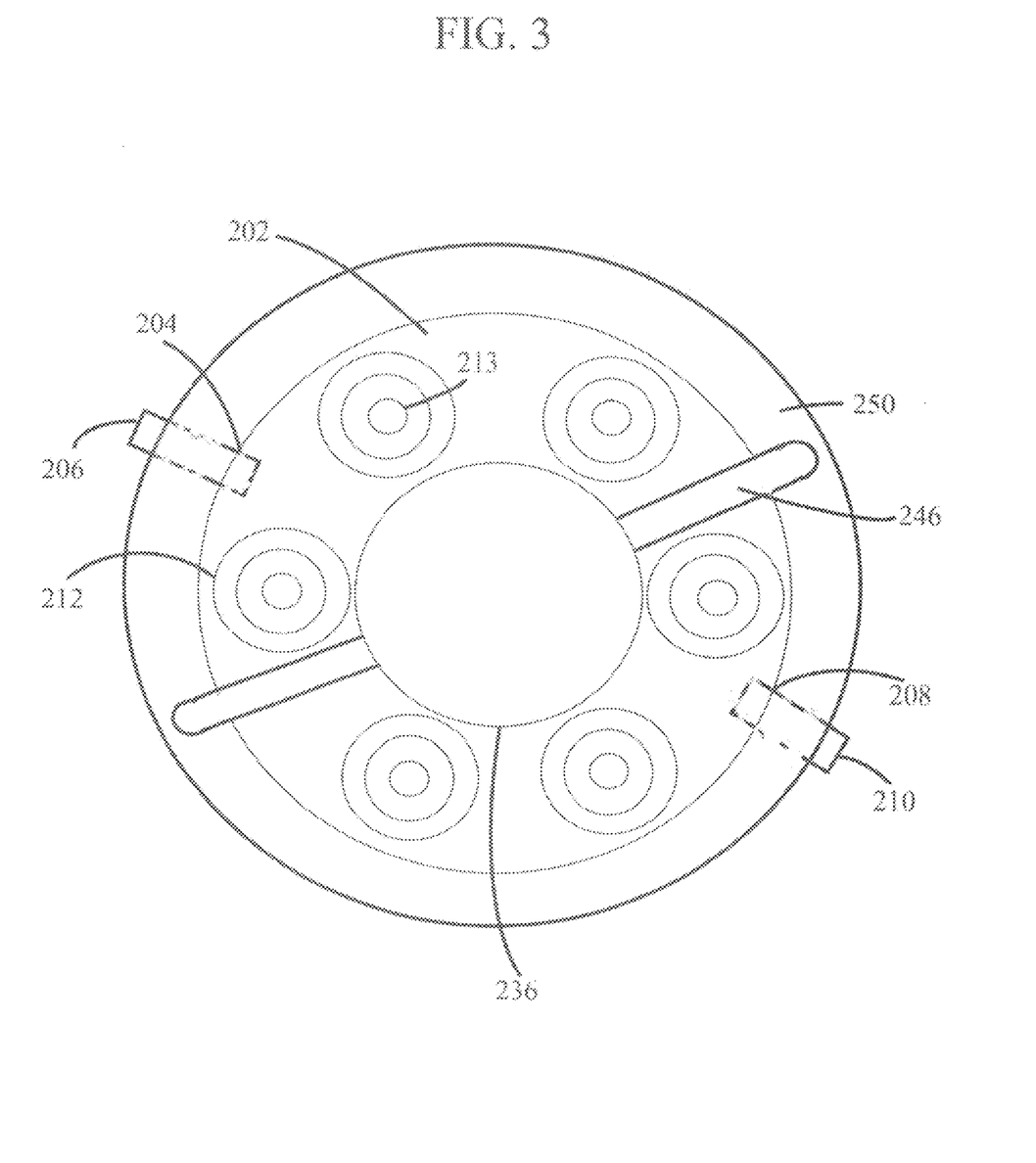
FIG. 3 is a view of the top of a combination ozone generator and UV germicidal apparatus according to one embodiment of the present invention.

FIG. 3 illustrates a top view of a portion of the apparatus 100 according to one embodiment of the present invention as shown in FIGS. 1 and 2. This top view shows the UV lamps 212, UV lamp connectors 213, opening 204 and connector 206 to the first sealed container 202, top end-cap 236, opening 208 and connector 210 for the exit of pressurized ozonated air from the first sealed container 202, cooling fluid conduit 246, and second sealed chamber 250.

Figure 4:
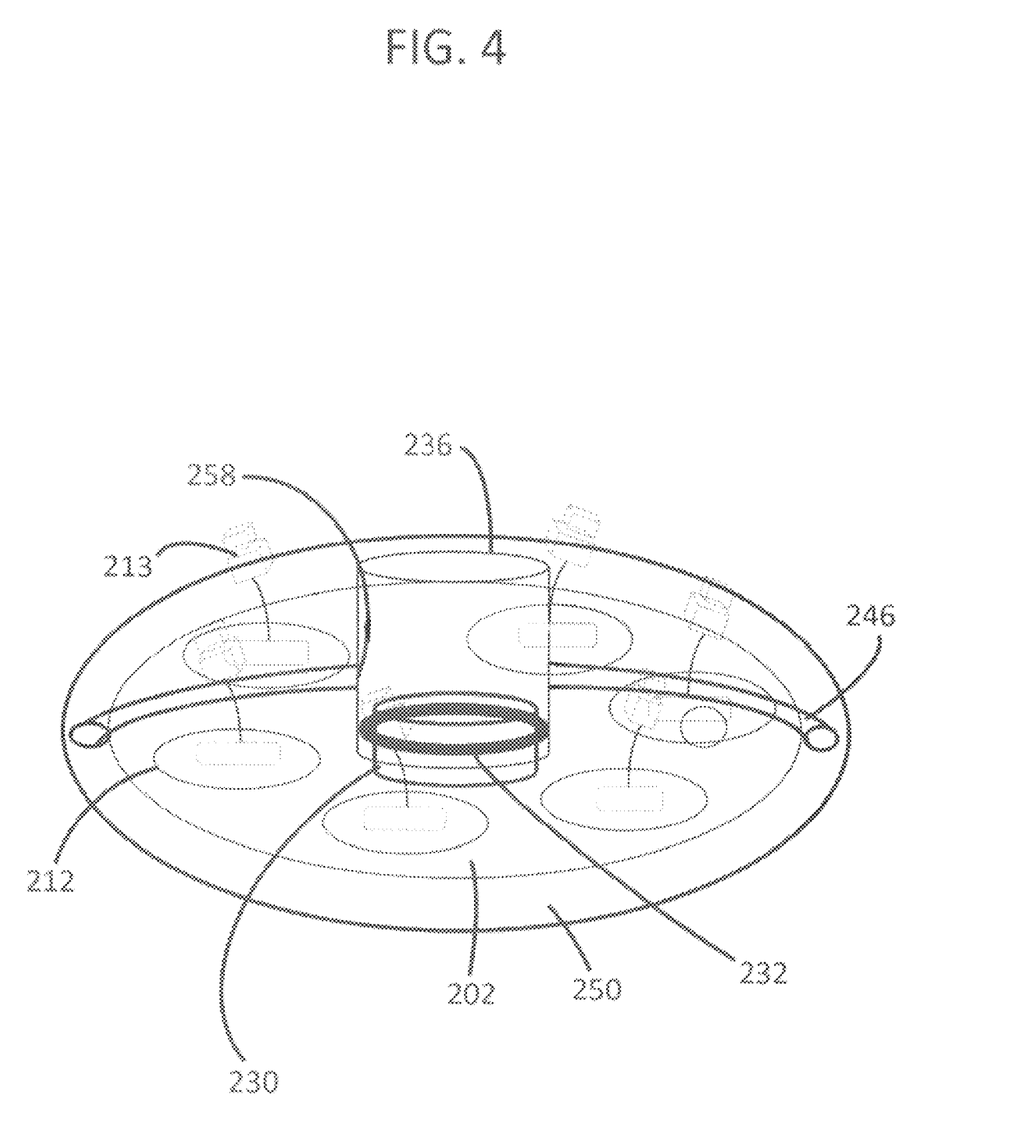
FIG. 4 is a detailed view partially in phantom of the top portion of a combination ozone generator and UV germicidal apparatus according to one embodiment of the present invention.

FIG. 4 illustrates a view partially in phantom of a portion of the apparatus 100 according to one embodiment of the present invention as shown in FIGS. 1 and 2. This view shows the UV lamps 212, UV lamp connectors 213, connector 206 to the first sealed container 202, end-cap 236, connector 210 for exit of pressurized ozonated air from the second sealed container 250, cooling fluid conduit 246, opening 258 into the top end-cap 236 for the fluid to return to the lift tube 167 (not shown), quartz tube 230, and O-ring 232 inside the end-cap 236 of the apparatus 100.

FIG. 5 illustrates, according to one embodiment of the present invention, apparatus 100 connected to and as part of a lift tube for the treatment of fluid in a fluid storage tank 140. As seen in FIG. 5, fluid flows into the lift tube 144 via conduit 154 from fluid tank 140 through opening 143. Conduit 154 may or not go down at least several meters before connecting to the lower end of lift tube 144 depending upon the height of the fluid level in the fluid storage tank. Preferably, a lift tube is about 3 meters long to allow for greater ozone to be dissolved into the fluid. In one embodiment, conduit 154 connects to lift tube 144 via a 3-way connector 164 whose other end is connected to a drain valve 161. In lift tube 144, the fluid comes in contact with bubbles of ozone gas and air (so-called ozonated air) produced by diffuser 146. Diffuser 146 is preferably a conventional diffuser stone. The ozonated air is produced by apparatus 100 which uses pressurized treated air or oxygen via conduit 171 (and through check valve 174) from an air pump 170 which enters opening 204 of apparatus 100 via its connector 206. The pressurized ozonated air exits apparatus 100 via opening 208 and connector 210 into conduit 173, through the top of lift tube 169 under the cap 181 and then to conduit 124 which connects to diffuser 146. A gas line anti-siphon check valve 160 may be included in between conduit gas lines 173 and 124 to prevent fluid from lift tube 144 flooding apparatus 100.

Diffuser 146 and the out-flow end of ozonated air gas line 173 can be positioned in lift tube 144 by either being lowered down into the lift tube directly by removing the cap 181 or positioned in the lift tube through a Y connector (not shown) at the bottom of the lift tube. Normally a Y connector would not be practical because the lift tube in many cases will be buried at least several feet into the ground. In such a case, it would be more convenient to lower the diffuser 146 directly down into the lift tube from its top. However, in some situations, for example if the main fluid reservoir comprises a plurality of storage tanks located on the top of a building, and the lift tube is attached to the side of the building, it may be very convenient to connect the ozone line through a Y connector at the bottom of the lift tube. In addition, one has to periodically clean the diffuser stone, and to do so, it needs to be removed from the lift tube 144 and soaked in Muriatic acid (or other suitable cleaning agents), in the case where there is the need to dissolve iron or manganese that may clog the diffuser stone over time. This is another reason for inserting and removing the diffuser via the top of the lift tube 144 in most configurations, rather than through a Y connector. Drain valve 161 enables the fluid in lift tube 144 to be drained out.

The diffuser 146 releases the ozonated air into the fluid in lift tube 144 in the form of thousands of small bubbles 180 of ozonated air. In FIG. 5, according to this embodiment, the lift tube 144 preferable has a diameter of 2 inches (however, in other embodiments, the lift tube may be smaller or larger depending upon the size, height, and treatment requirements of the main fluid reservoir 140 or storage tank) and a length of about 3.5 meters. Lift tube 144 preferably is oriented straight up to prevent the ozonated air bubbles in lift tube 144 from coalescing. The rising ozonated air bubbles 180 pull the fluid upwards inside the lift tube 144. In general, the longer the lift tube the better, as it provides more fluid pressure and mixing of the ozonated air with the fluid and more contact time between the fluid and the ozonated air bubbles, to enable more ozone to both dissolve in the fluid and to produce more lift of the fluid and a higher fluid flow rate. A limiting factor on the length of the lift tube is the ability of the diffuser to emit bubbles, since the fluid pressure exerted on the diffuser increases as the lift tube's length is increased and the diffuser is positioned deeper in the lift tube. Apparatus 100 preferably would be positioned towards the upper portion of the lift tube for convenience, maintenance, and repair, and to allow more ozone to dissolve into the fluid to be treated. Preferably, apparatus 100 would connect to lift tube 144 via connector 165 on the bottom end-cap 238 of apparatus 100.

At the top end of apparatus 100, the end-cap 236 connects to a conventional connector fitting 167 which is connected to a special three-way connector 166 and then to lift tube 169. Fluid flows up 3-way connector 166 with a special 45 degree upward slope so that fluid can also flow into conduit 162 and into reservoir 140 through opening 182. The fluid level 195 at the top of the lift tube 169 is the same as the fluid level 196 in the reservoir 140. The fittings 167, 166, and lift tube 169 and conduit 162 lift the fluid into fluid reservoir 140 under the force of the rising ozonated air bubbles 183. Excess ozonated air dissipates in the air through opening 188 in the fluid reservoir 140 and/or the top of the lift tube 169 at opening 189 in cap 181. Fluid reservoir 140 may be fitted with a screen or semi-sealed top 186 to prevent insects, birds, leaves, dust, etc. from falling into the fluid in the reservoir 140 and/or to capture the excess ozonated air emanating from the surface of the fluid in reservoir 140 for later use or conversion back to simple oxygen. An opening 188 in top 186 may be used to pipe away any excess ozonated air from reservoir 140 via another airline (not shown) or to destroy any excess ozone gas. The cap 181 and opening 189 on the top of lift tube extension 169 may also be used for the same purpose.

According to the present embodiment, fluid reservoir 140 can be any size and any height, as long as the air pump 170, apparatus 100, diffuser, lift tube, etc., are all sized appropriately.

A float valve 177 is preferably positioned in said fluid reservoir 140 for sensing when the fluid level 196 in said fluid reservoir 140 drops below a predetermined level. A conduit 179 connected between said fluid reservoir 140 and an external fluid source (not shown) enables fluid to be added to said fluid reservoir 140 in response to the sensing by float valve 177 of low fluid level.

The fluid path for fluid in the ozone-assisted water treatment apparatus shown in FIG. 5 is from the fluid reservoir 140, to the conduit 154, to the lift tube 144, through apparatus 100, to fittings 167 and 166, lift tube 169, and conduit 162 back to the fluid reservoir, with fluid flow being created by the bubbles in the lift tube 144 generated by diffuser 146.

FIG. 6 illustrates another embodiment of the present Invention whereby apparatus 100 is used to ozonate and purify fluid, usually water, in a pool, spa, or other main reservoir represented by 172. As shown in FIG. 6, the treated fluid passes an auxiliary fluid tank 199, which may or may not contain a filter 142, and back the pool, spa, or main reservoir 174 from whence it came.

As shown in FIG. 6, fluid from a main reservoir 172 enters conduit 154 and goes into and up lift tube 144, through apparatus 100, and through fittings 167 and 166 in the same fashion as in FIG. 5. But, instead of flowing into a fluid storage tank, the fluid goes into an auxiliary fluid tank 199 where the fluid is filtered by filter 142 and returns via conduit 148 back to main reservoir 176 which might be a pool, spa, or other reservoir. As shown in FIG. 6, the air pump 170, apparatus 100, gas lines, diffuser, etc., all work in the same manner as in FIG. 5.

Figure 7:
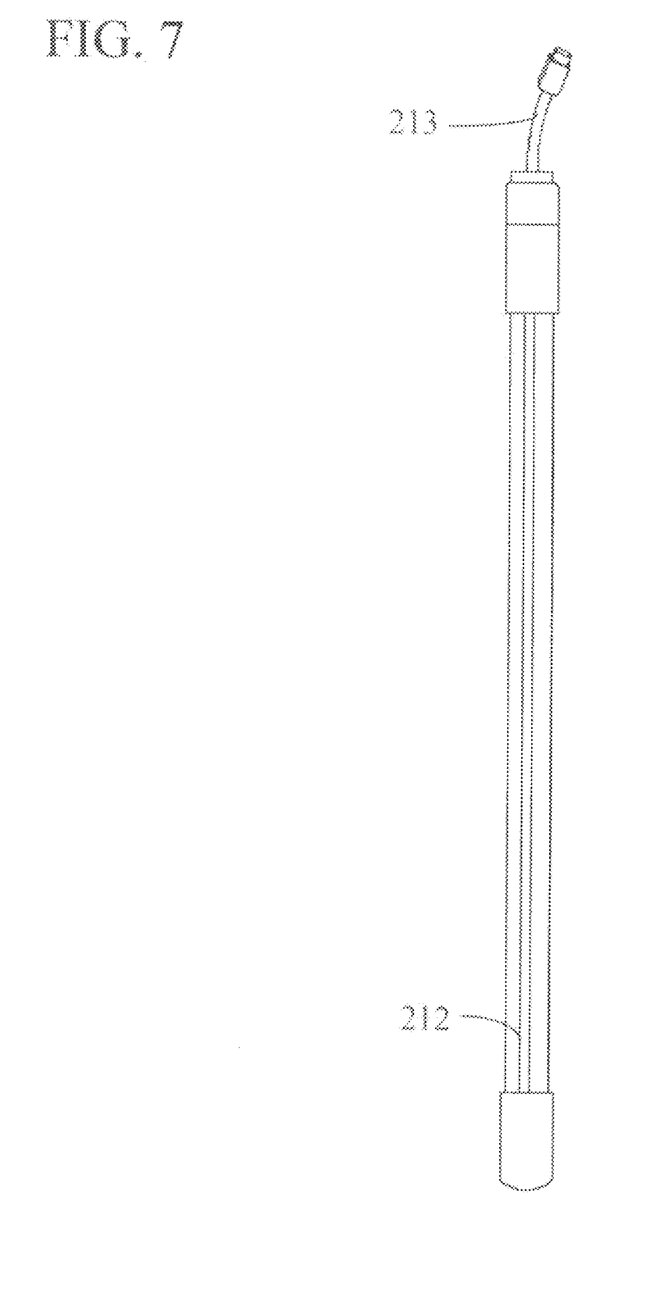
FIG. 7 is a detailed view of a UV lamp source sized to be positioned in the first sealed chamber of the combination ozone generator and UV germicidal apparatus as shown in FIGS. 1 and 2 according to one embodiment of the present invention.

FIG. 7 illustrates a sample UV lamp 212 and electrical connector 213 which might be used in apparatus 100 according to one embodiment of the present invention.

What is claimed is:

1. A combination UV ozone generator and UV germicidal radiation apparatus for purifying fluid in a fluid reservoir positioned operatively adjacent said apparatus comprising:

a first sealed container having a first opening for enabling air to be pumped into a first space inside said first sealed container and a second opening for enabling air in said first sealed container to exit said first sealed container;

one or more UV tight sources positioned in said first space inside said first sealed container for generating UV light, said UV light causing the air in the first sealed container to be irradiated by said UV light, to thereby cause at least some of the air in said first sealed container to be converted into ozone gas as said air traverses the interior of said first sealed container from said first opening to said second opening;

a lift tube having a lower end and an upper end, said lift tube positioned to enable fluid from said fluid reservoir to flow by gravity into said lower end;

a diffuser positioned in said lower end of said lift tube;

a conduit connected at one end to said second opening of said first sealed container for enabling said ozonated air to be coupled to said diffuser, said diffuser for injecting said ozonated air into said lift tube as air baubles, said ozonated air bubbles for causing the fluid in said lift tube to be ozone-aerated and for causing the fluid in said lift tube to flow up said lift tube;

a second sealed container positioned inside said first sealed container including a transparent tube, wherein the interior of said transparent tube defines a second space isolated from said first space, said second sealed container having a first opening at one end and a second opening at a second end above said first opening, the upper end of said lift tube connected to said first opening of said transparent tube for enabling ozonated fluid flowing in said lift tube to flow up and into said transparent tube and to exit said transparent tube through said second opening of said transparent tube, said one or more UV light sources for causing said ozonated fluid flowing in said transparent tube to be irradiated by UV light, said irradiation enabling a germicidal effect to be created in said fluid;

a second conduit attached at one end to the second opening of said transparent tube; and a third container having first and second ends, said first end operatively connected to said lift tube and said second end operatively connected to said second conduit for causing a selected amount of fluid in said lift tube to flow through said third container instead of through said transparent tube.

2. The apparatus of claim 1 wherein said one or more UV light sources are positioned to cause UV light to irradiate the ozonated fluid flowing in said transparent tube, to cause at least some of the ozonated fluid flowing in said transparent tube to undergo a reaction whereby some of the ozone in said fluid is converted into advanced oxidation products that enhance the germicidal effect of said UV light.

3. The apparatus of claim 1 wherein said one or more UV light sources comprises a plurality of UV light sources arrayed in said first space in said first sealed container at equally spaced intervals around the exterior of said transparent tube.

4. The apparatus of claim 1 wherein said first sealed container is in the shape of a cylinder having art outer surface and an inner surface, said inner surface having a mirrored surface for enabling an increased amount of UV light to be reflected towards said transparent tube.

5. The apparatus of claim 1 wherein said third sealed container surrounds at least a portion of said first sealed container, said third scaled container for enabling said first scaled container to be cooled when fluid is caused to flow through said third sealed container.

6. The apparatus of claim 1, wherein said transparent tube comprises a quartz tube able to transmit 185 and 254 nanometer wavelength light.

7. The apparatus of claim 1 further comprising a third conduit attached at one end to the second opening of said transparent tube for causing said fluid exiting said transparent tube to flow by gravity back into said fluid reservoir.

* * * * *